US009134870B2

(12) United States Patent
Lee et al.

(10) Patent No.: US 9,134,870 B2
(45) Date of Patent: Sep. 15, 2015

(54) CAPACITIVE TOUCH-SENSITIVE PANEL AND MOBILE TERMINAL USING THE SAME

(71) Applicant: Anapass Inc., Seoul (KR)

(72) Inventors: Jong Hwa Lee, Seoul (KR); Hyuk Soo Lim, Seoul (KR); Jung Hoon Ahn, Seoul (KR)

(73) Assignee: ANAPASS INC., Seoul (KR)

( * ) Notice: Subject to any disclaimer, the term of this patent is extended or adjusted under 35 U.S.C. 154(b) by 49 days.

(21) Appl. No.: 14/250,682

(22) Filed: Apr. 11, 2014

(65) Prior Publication Data
US 2014/0320763 A1 Oct. 30, 2014

(30) Foreign Application Priority Data

Apr. 25, 2013 (KR) ........................ 10-2013-0046242

(51) Int. Cl.
G06F 3/044 (2006.01)
(52) U.S. Cl.
CPC ..................................... G06F 3/044 (2013.01)

(58) Field of Classification Search
CPC ........ G06F 3/044; G06F 3/045; G06F 3/0412
See application file for complete search history.

(56) References Cited

U.S. PATENT DOCUMENTS

| 7,920,129 | B2 | 4/2011 | Hotelling et al. | |
| 8,681,119 | B2* | 3/2014 | Golovchenko et al. | 345/174 |
| 2002/0093491 | A1* | 7/2002 | Gillespie et al. | 345/173 |
| 2010/0214247 | A1* | 8/2010 | Tang et al. | 345/173 |
| 2014/0152580 | A1* | 6/2014 | Weaver et al. | 345/173 |

* cited by examiner

Primary Examiner — Ricardo L Osorio
(74) Attorney, Agent, or Firm — Paratus Law Group, PLLC

(57) ABSTRACT

Disclosed is a capacitive touch-sensitive panel. The capacitive touch-sensitive panel includes a dielectric substrate, a plurality of first conductive traces which extend in a first direction and are formed on one surface of the dielectric substrate, and a plurality of second conductive traces which are formed on the other surface of the dielectric substrate. Here, the second conductive traces include a main trace which extends in a second direction, a first branch which extends so as to obliquely intersect the main trace, and a second branch which is connected to the first branch, and the second branch connected to the first branch so as to intersect the first branch.

23 Claims, 9 Drawing Sheets

CAPACITIVE TOUCH-SENSITIVE PANEL AND MOBILE TERMINAL USING THE SAME

CROSS-REFERENCE TO RELATED APPLICATION

This application claims priority to and the benefit of Korean Patent Application No. 10-2013-0046242, filed on Apr. 25, 2013, the disclosure of which is incorporated herein by reference in its entirety.

BACKGROUND

1. Field of the Invention

The present invention relates to a capacitive touch-sensitive panel.

2. Discussion of Related Art

Object Detection methods currently used in a touch screen mainly includes a resistive method, a surface acoustic wave method, surface capacitive method and a projected capacitive method. In case of the projected capacitive method, multi-touch detection is possible, and excellent durability and visibility can be exhibited, and therefore the projected capacitive method has been adopted as a main input means of a portable mobile device.

The capacitive touch screen controller may detect changes in an amount of electric charges charged in capacitive sensors on a touch screen panel by user interference to recognize a user input, and be classified into a self-capacitive method and a mutual-capacitive method in accordance with an electric charge accumulation method. The self-capacitive method configures a single conductor per a capacitive sensor to form an electric charge surface with a reference ground outside the sensor while the mutual-capacitive method allows two conductors on the touch screen panel to mutually form electric charge surfaces so as to serve as a capacitive sensor.

In general, self-capacitive method uses X/Y orthogonal type conductor arrangement, and in this case, each capacitive sensor serves as a line sensor, and therefore only one axial information of X location and Y-location are provided from each of an X-line sensor group and a Y-line sensor group every time when the touch screen is scanned. Thus, in the self-capacitive touch screen, detection and tracking of a single touch may be possible, but a multi-touch may not be fully supported. The mutual-capacitive method also uses the X/Y orthogonal type conductor arrangement, but is different from the self-capacitive method in that each capacitive sensor is provided in the form of a grid sensor at each location where X conductor and Y conductor cross each other and responses of all the grid sensors are sensed independently when a user input is applied on the touch screen. Each grid sensor provides a response which corresponds to one-X/Y location and is independent to each other, and therefore, in the mutual-capacitive touch screen, user input information may be extracted from an X/Y two axial information set provided by an X/Y grid sensor set, thereby detecting and tracking the multi-touch applied by a user can be accomplished.

A configuration of a conductor of a general mutual-capacitive touch screen panel and a detection method thereof will be herein described. First electrodes including a conductor extending in any one direction and second electrodes including a conductor extending in a direction orthogonal to the first electrodes form a mutual-capacitive sensor through a dielectric material between the two electrodes. A capacitance C of the mutual-capacitive sensor is defined as $C=\varepsilon * a/d$ when a distance of the two electrodes is 'd.', an area of an electric charge surface is 'a', and an equivalent dielectric constant of all dielectric materials existing between electric charge surfaces is '$\varepsilon$', and has a relationship of $Q=CV$ with an amount Q of electric charges accumulated on the mutual-capacitive sensor and a potential difference V applied to two electrodes/electric charge surfaces to induce charge accumulation. When a user approaches a sensor, interference to an electric field formed between the two electrodes may occur to prevent a part of electric charges from being accumulated on the sensor, and therefore an amount of electric charges accumulated on the sensor may be reduced, thereby reducing the capacitance. This may be understood as a change in the capacitance caused by a change in an equivalent dielectric constant between the electric charge surfaces due to the user's approach to the sensor, but the actual physical phenomenon that happens is that a part of the electric field between the electric charge surfaces is shunted due to the user's approach so that the amount of electric charge accumulated on the surfaces are reduced. When applying an AC waveform to one electric charge surface of the sensor by connecting an AC voltage source to the first electrode, variation ($\Delta Q$) of $\Delta Q = C \Delta V$ in the amount of electric charge with respect to the capacitance C which varies in accordance with a degree of the user's approach to the sensor may occur, and the charge variation may be converted into a current or a voltage form by a read-out circuit connected to the second electrode. Such converted information may be generally subjected to signal processing operations such as noise filtering, demodulation, digital conversion, accumulation, and the like to be used in a coordinate tracking algorithm and a gesture recognition algorithm. An example of a capacitive touch-sensitive panel is described in U.S. Pat. No. 7,920,129.

In a conventional electrode configuration, a contact area between an object for applying a touch input to a touch panel and a cover window in contact with the object is large enough for a plurality of sensors to participate in performing touch detection, thereby touch coordinates extracted and gestures recognized are relatively smooth and stable. However, when a touch input is applied by a child's finger or a woman's finger with a relatively small cross-sectional area, only a limited number of sensors may participate in performing touch detection, and therefore incorrect touch coordinates may be extracted, or an incorrect trajectory may be traced due to non-linear response to movement of an object.

SUMMARY OF THE INVENTION

The present invention is directed to a touch panel in which a plurality of sensors may participate in touch detection even when a touch input is applied by an object with a relatively small cross-sectional area, so that more accurate coordinates are extracted, and the coordinates may trace the movement of the object more linearly.

According to an aspect of the present invention, there is provided a capacitive touch-sensitive panel including a dielectric substrate, a plurality of first conductive traces which extend in a first direction and are formed on one surface of the dielectric substrate, and a plurality of second conductive traces which are formed on the other surface of the dielectric substrate, wherein the second conductive traces include a main trace which extends in a second direction, a first branch which extends so as to obliquely intersect the main trace, and a second branch which is connected to the first branch, and the second branch extends so as to intersect the first branch at an angle at which the second branch is not connected to another adjacent second branch.

According to another aspect of the present invention, there is provided a mobile terminal which includes a capacitive touch-sensitive panel including a dielectric substrate, a plurality of first conductive traces which extend in a first direction and are formed on one surface of the dielectric substrate, and a plurality of second conductive traces which are formed on the other surface of the dielectric substrate, wherein the second conductive traces include a main trace which extends in a second direction, a first branch which extends so as to obliquely intersect the main trace, and a second branch which is connected to the first branch, and the second branch extends so as to intersect the first branch at an angle at which the second branch is not connected to another adjacent second branch.

According to still another aspect of the present invention, there is provided a capacitive touch-sensitive panel including a plurality of driving electrodes which extend in a first direction and a plurality of sensing electrodes which are spaced apart from the plurality of driving electrodes by a dielectric substrate, wherein the plurality of sensing electrodes include a main sensing electrode which extends in a direction orthogonal to the first direction, a first interpolation branch which extends so as to obliquely intersect the main sensing electrode, and a second interpolation branch which is connected to the first interpolation branch, and the second interpolation branch extends so as to intersect the first interpolation branch at an angle at which the second interpolation branch is not connected to another adjacent second interpolation branch.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Example embodiments of the present invention are disclosed herein. However, specific structural and functional details disclosed herein are merely representative for purposes of describing example embodiments of the present invention, and thus the example embodiments of the present invention may be embodied in many alternate forms and should not be construed as limited to the example embodiments of the present invention set forth herein.

Unless otherwise defined, all terms (including technical and scientific terms) used herein have the same meaning as commonly understood by one with ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
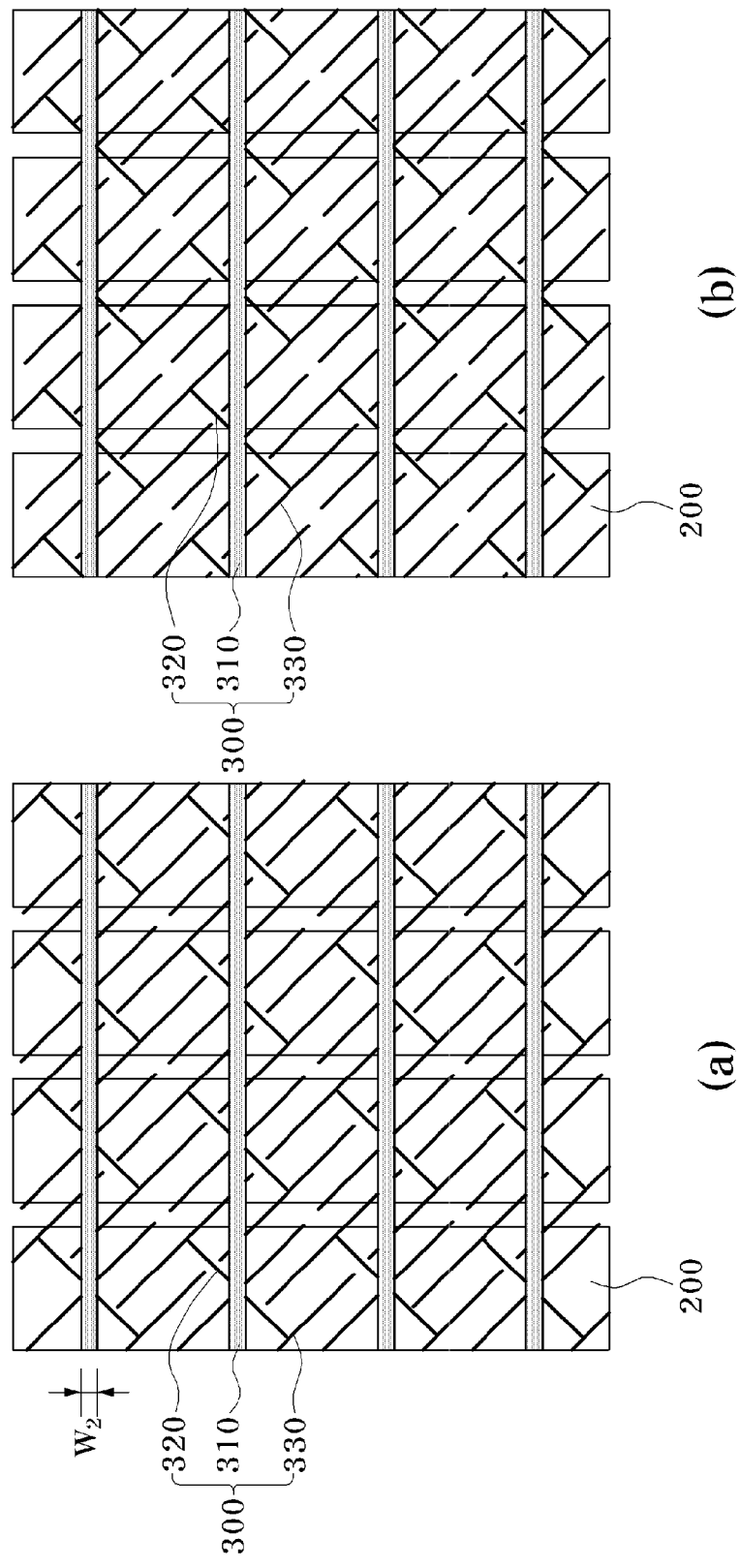
FIG. 1 is a schematic diagram illustrating an implementation example of a capacitive touch-sensitive panel according to an embodiment of the present invention.

Hereinafter, embodiments of the present invention will be described with reference to the accompanying drawings. FIG. 1 is a perspective top view illustrating a capacitive touch-sensitive panel according to an embodiment of the present invention. Referring to FIG. 1, the capacitive touch-sensitive panel includes a dielectric substrate, a plurality of first conductive traces which extend in a first direction and are formed on one surface of the dielectric substrate, and a plurality of second conductive traces which are formed on the other surface of the dielectric substrate. Here, the second conductive traces include a main trace which extends in a second direction, a first branch which extends so as to obliquely intersect the main trace, and a second branch which is connected to the first branch. In addition, the second branch extends so as to intersect the first branch at an angle at which the second branch is not connected to another adjacent second branch. In the below perspective top views including FIG. 1, the dielectric substrate is not illustrated.

The dielectric substrate (see 100 of FIG. 3) is a substrate made of a material having predetermined dielectric permittivity. The first conductive traces 200 are positioned on one surface of the dielectric substrate, and the second conductive traces 300 are positioned on the other surface thereof. According to an embodiment of the present invention, when the capacitive touch-sensitive panel according to an embodiment of the present invention is mounted in a display panel to form a touch screen, the dielectric substrate may be transparent in order to transmit visual information displayed by the display panel. As an example, the dielectric substrate may be a glass substrate.

The first conductive traces 200 are positioned on one surface of the dielectric substrate, and extend in a first direction. The first conductive traces 200 are electrically connected to a driving circuit (not shown), and an electric field flux is formed between the first conductive traces 200 and the second conductive traces 300 when electrical stimulation is applied to the first conductive traces 200 by the driving circuit. According to an embodiment of the present invention, the first and second conductive traces 200 and 300 may be made of a transparent material having conductivity such as indium tin oxide (ITO), indium zinc oxide (IZO), aluminium zinc oxide (AZO), or indium cadmium oxide (ICO). According to another embodiment of the present invention, the first conductive traces 200 may be formed of a carbon nanotube (CNT) film. The CNT film may flow a current with relatively higher density than that of a transparent conductive material such as ITO.

Figure 2:
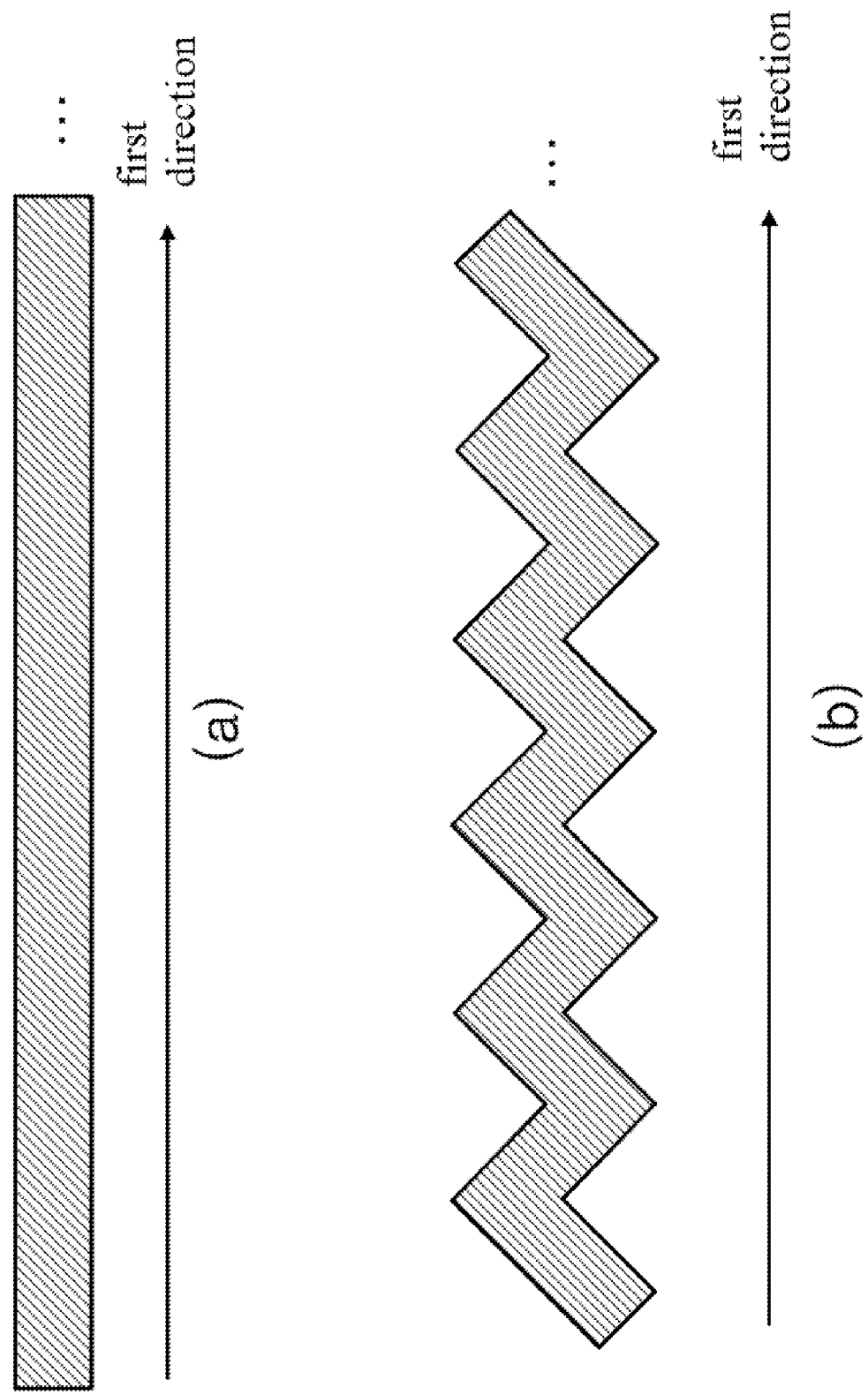
FIG. 2 is a diagram illustrating definition used in the present invention.

Extending in the first direction in the present specification means extending in the first direction in a linear form as shown in FIG. 2A, and also includes extending in the first direction in the form of zigzag as shown in FIG. 2B. In addition, although not shown, extending in the first direction in the present specification includes extending in the first direction in a sinusoidal curve form other than the zigzag form.

Figure 3:
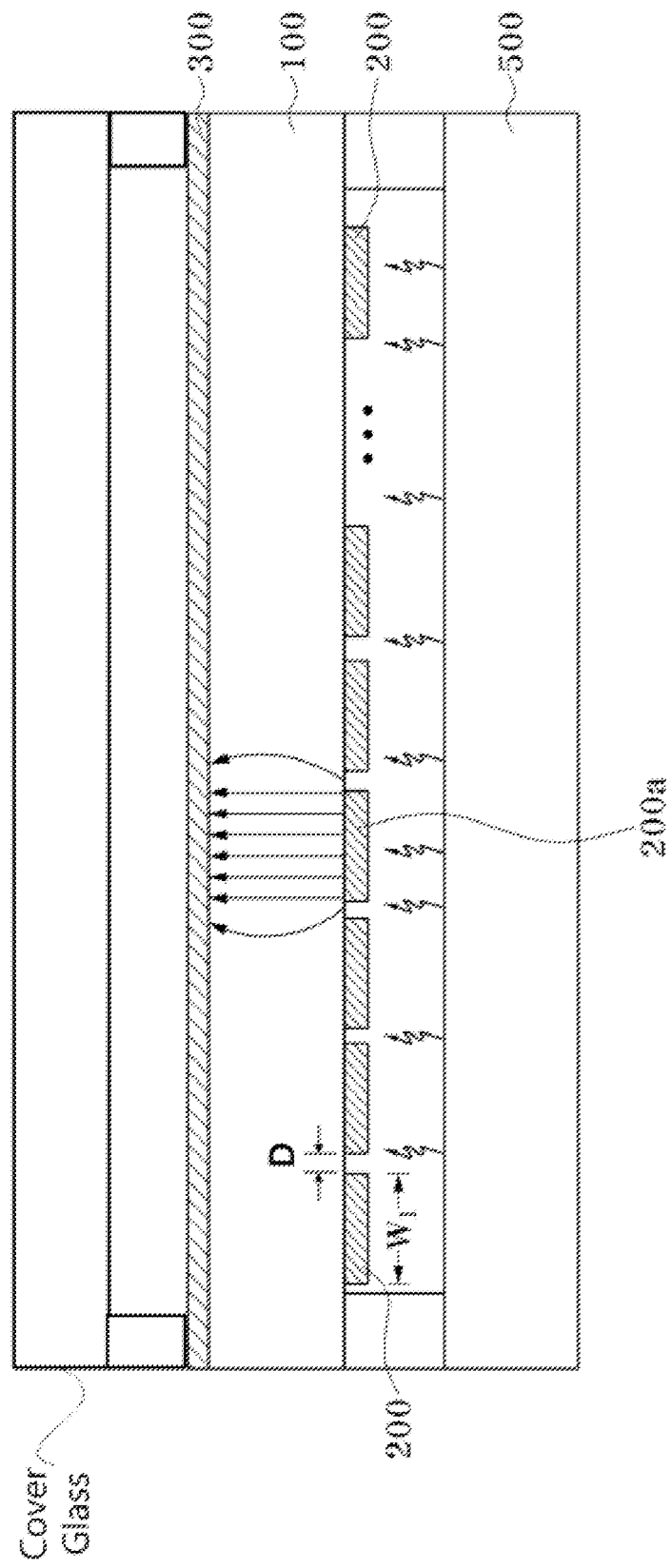
FIG. 3 is a schematic diagram illustrating a state in which a capacitive touch-sensitive panel according to an embodiment of the present invention is mounted in a display device.

FIG. 3 is a schematic diagram illustrating a state in which a capacitive touch-sensitive panel according to an embodiment of the present invention is mounted in a display device 500. Referring to FIG. 3, the display device 500 may be a liquid crystal display (LCD), active matrix organic light emitting device (AMOLED), or the like. In case of the LCD, when a high potential is applied in order to drive the LCD, noise that occurs in a common voltage (Vcom) electrode due to the high potential flows into a touch panel, whereby accuracy of touch information detected by the touch panel may be degraded.

According to an embodiment of the present invention, in order to block the noise emitted from the display device 500 mounted below the capacitive touch-sensitive panel, first conductive traces 200 not stimulated are coupled to a low impedance source, or a ground potential. Referring to FIG. 3, in order to detect a touch, at least one of the first conductive traces 200 may be stimulated and form an electric field flux with the second conductive trace, and the other first conductive traces 200b may be electrically connected to the low impedance source or the ground potential. In addition, a width W1 of each of the first conductive traces 200 is larger than a width W2 (see FIG. 1) of the main trace of the second conductive trace 300, and a distance D between the first conductive traces is smaller than the width W1 of the first conductive trace. Thus, noise emitted from the display device 500 is shielded by the first conductive trace connected to the low impedance source (not shown) or the ground potential, thereby improving touch sensitivity.

Referring again to FIG. 1, the plurality of second conductive traces 300 are positioned on the other surface of the dielectric substrate, and include a main trace 310 which extends in a second direction, a first branch 320 which is connected to the main trace so as to obliquely intersect the main trace, and a second branch 330 which is connected to the first branch, and the second branch 330 extends so as to intersect the first branch at an angle at which the second branch is not connected to another adjacent second branch. According to an embodiment, the second conductive traces 300 are connected to a read-out circuit (not shown) that can detect a change of capacitance values which occur when an object touches a touch panel. The main trace 310 extends in a direction orthogonal to a direction in which the first conductive trace 200 extends, and each of the main traces is disposed in parallel with each other.

The width W2 of the main trace 310 is smaller than the width W1 of the first conductive trace. This is to facilitate formation of an electric field flux between the first conductive trace 200 and the object when a touch is occurred by an object.

The first branch 320 extends so as to obliquely intersect the main trace 310 at an intersection with the main trace 310, the second branch extends so as to intersect the first branch at an angle at which the second branch is not connected to another adjacent second branch, and the adjacent second conductive traces are disposed so as to be interdigitated.

Figure 4:
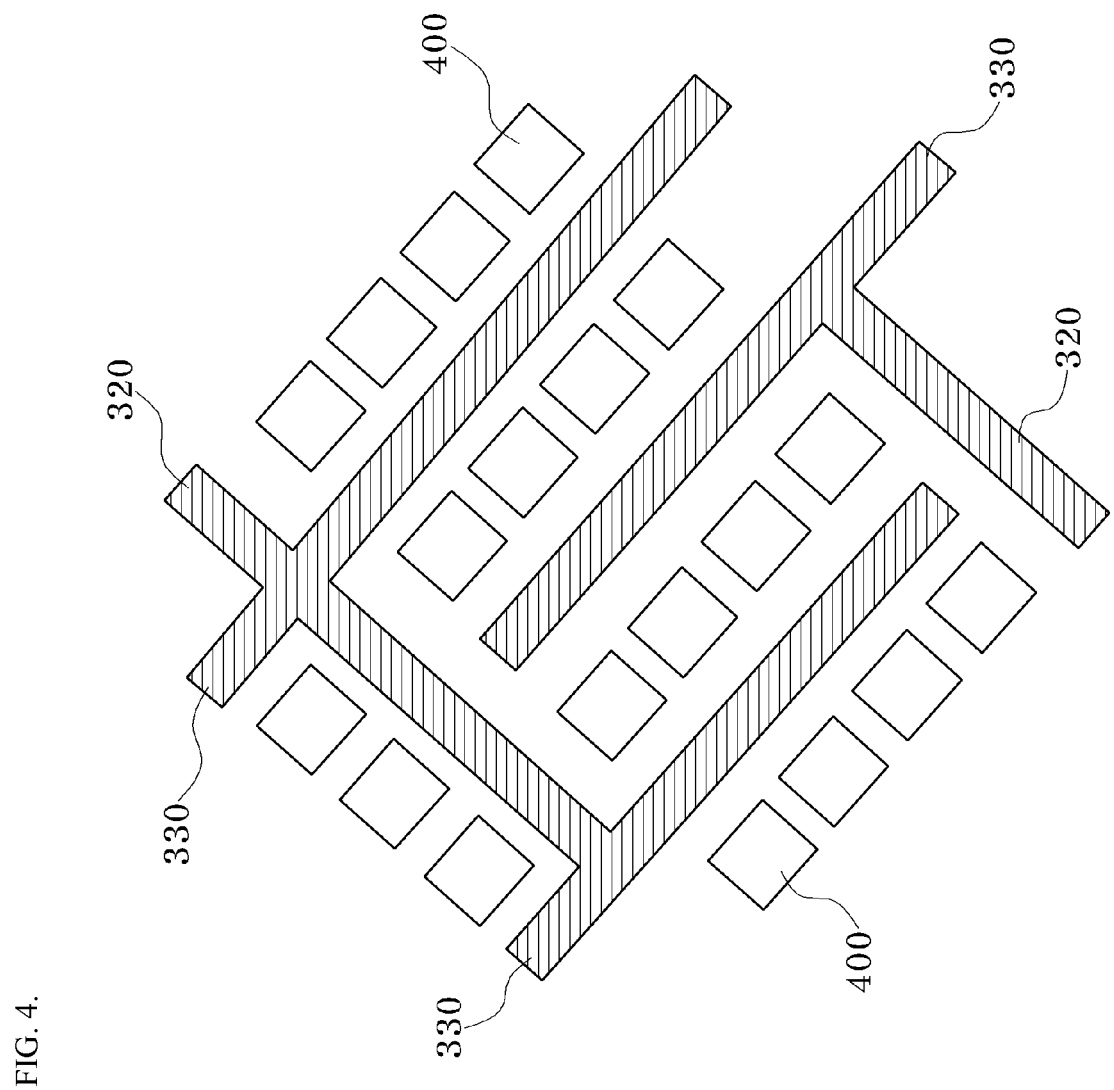
FIG. 4 is an enlarged diagram illustrating a partial region of FIG. 1.

FIG. 4 is an enlarged diagram illustrating a partial region of FIG. 1. Referring to FIG. 4, dummy patterns 400 which are in an electrical floating state may be disposed between the main traces 310, the first branches 320 and the second branches 330. The dummy patterns 400 may increase pattern regularity of the second conductive traces 300, and prevent distortion of an image displayed when the capacitive touch-sensitivity panel is attached to a display to form a touch screen.

In addition, the dummy patterns 400 are in the electrical floating state so that the dummy patterns 400 themselves may not generate an electric field flux. However, the dummy patterns 400 may relay and complement the electric field flux formed between the first conductive traces 200 and the second conductive traces 300.

Figure 5:
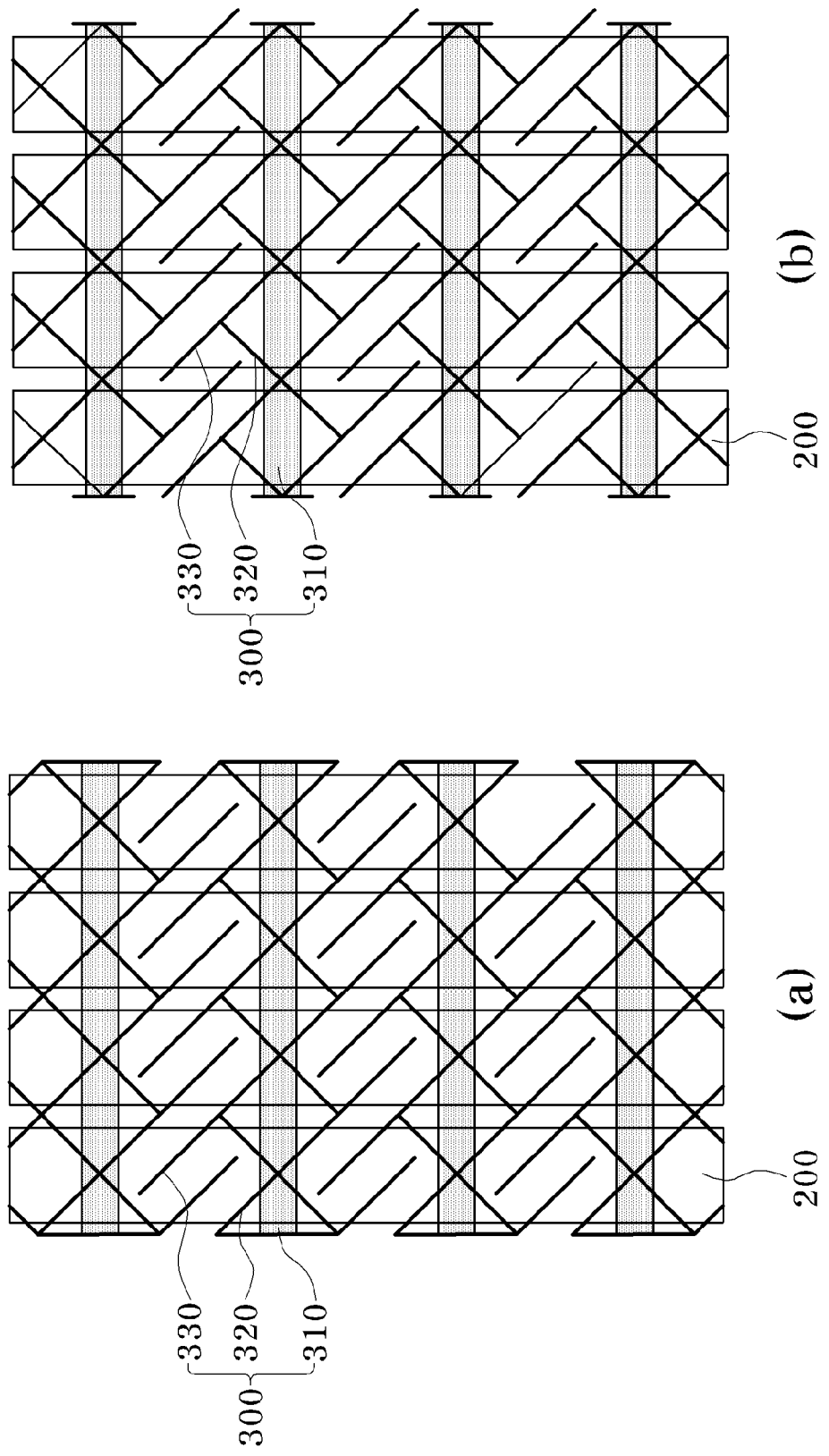
FIG. 5 is a schematic diagram illustrating a capacitive touch-sensitive panel according to an embodiment of the present invention.

FIG. 5 is a schematic diagram illustrating a capacitive touch-sensitive panel according to an embodiment of the present invention. Referring to FIG. 5, second branches positioned in first branches adjacent to each other are elongated in a straight line. As shown in FIG. 5A, an intersection of the first branch 320 and the main trace 310 may be disposed above the first conductive trace 200, and as shown in FIG. 5B, the intersection of the first branch 320 and the main trace 310 may be disposed above a gap between the adjacent first conductive traces. According to the present embodiment, there is provided an advantage that a resistance value of the second conductive trace can be reduced.

Referring to FIG. 1 and FIG. 5, first branches are interdigitated with the first branches of the adjacent second conductive traces and second branches are interdigitated with the second branches of the adjacent second conductive traces, so that first and second branches penetrates into the area occupied by adjacent conductive traces. Which enlarges the sensor coverage, the distance from the center of a sensor to the center of a touch location upto where a sensor can undergo a meaningful change of capacitance value. The enlarged sensor coverage means more sensors can respond to an smaller object and more sensor values are utilized in the interpolation to yield more accurate center coordinate of the object.

Figure 6:
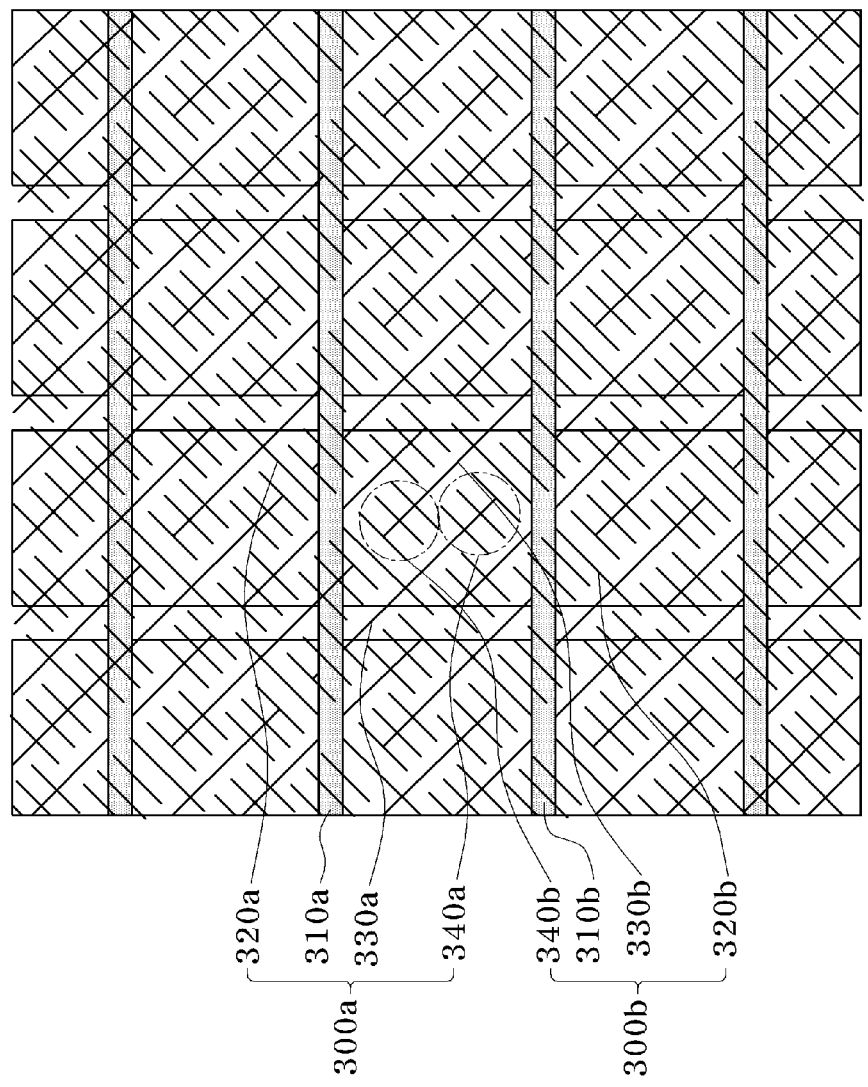
FIG. 6 is a schematic diagram illustrating a touch-sensitive panel in which a palm pattern is formed according to an embodiment of the present invention.

Referring to FIG. 6, a palm pattern 340 is formed in the second conductive trace 300. The palm pattern 340 is disposed in such a manner that a palm pattern 340a formed on any one adjacent second conductive trace and a palm pattern 340b formed on the other second conductive trace are interweaved.

Figure 7:
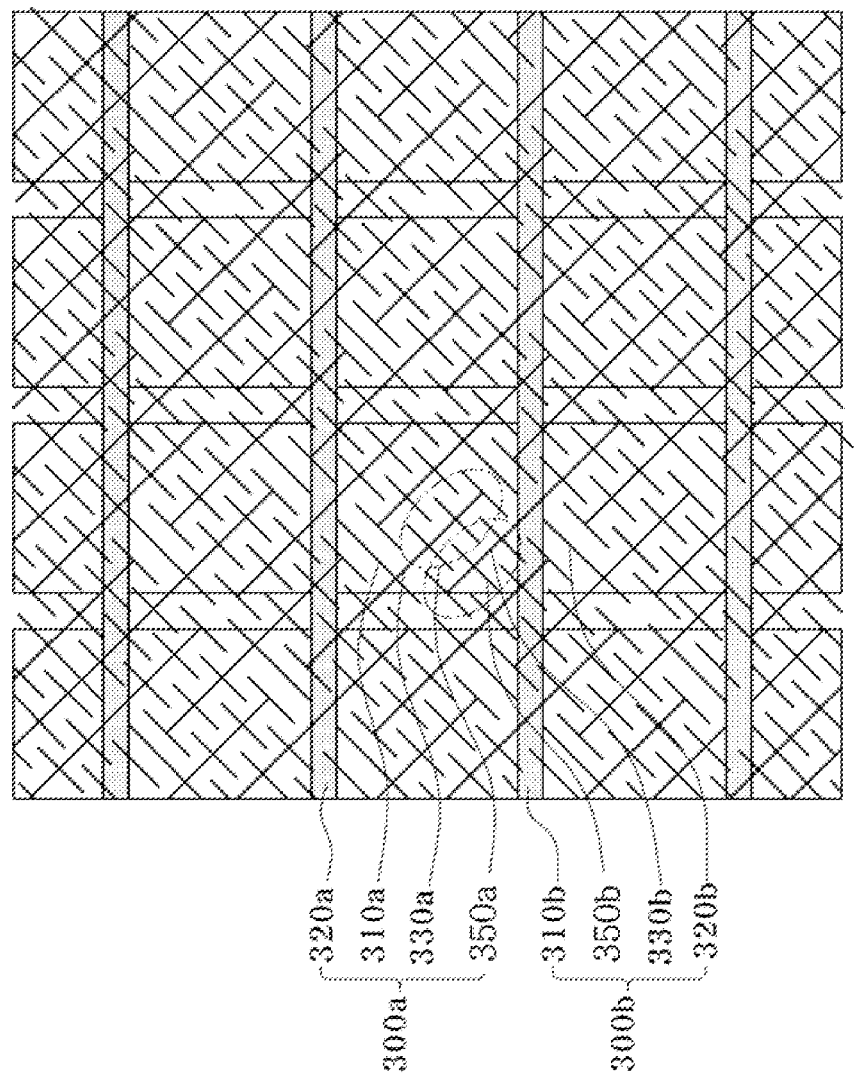
FIG. 7 is a schematic diagram illustrating a touch-sensitive panel in which a finger pattern is formed according to an embodiment of the present invention.

FIG. 7 is a schematic diagram illustrating a touch-sensitive panel in which a finger pattern is formed according to an embodiment of the present invention. Referring to FIG. 7, in the second conductive trace 300, at least one finger pattern 350 which is connected to the second conductive trace so as to intersect the second conductive trace in a predetermined direction is formed. The finger pattern 350 is disposed in such a manner that a finger pattern formed on any one adjacent second conductive trace and a finger pattern formed on the other second conductive trace are interdigitated.

Referring to FIG. 6 and FIG. 7, palm and finger patterns provide a mean to adjust capacitance profile to be more linear by weighting up the trace density at the end of the conductive traces. Because the capacitance of a sensor changes nonlinearly with respect to the distance from the center of the sensor to the center of an object, interpolation and weighted average, which is a linear calculation in its nature, to extract the center location of an object results in inaccurate coordinates. The center location of an object can be extracted more accurately by increasing pattern density at the end part of traces to have more linearized capacitance profile.

Since a palm pattern 340 or finger pattern 350 is a line pattern rather than a planar pattern, an electric field flux can be formed effectively not also between first conductive traces and an object but also between second conductive traces and the object, while enlarged sensor coverage is maintained.

The interweaved palm pattern or the interdigitated finger pattern also improves interpolation characteristics of the second conductive traces adjacent to each other. That is, when a touch is occurred on a second conductive trace pattern by an object, coverage with respect to an area in which the touch is generated may be increased by the palm pattern 340 or the finger pattern 350 connected to the second branch 330, and therefore interpolation characteristics can be improved.

In addition, as a distance between a pattern that forms a sensor and touch point of a object is larger, reactivity between the object and the sensor may be reduced, but even when sensing a position spaced from the sensor by introduction of the finger pattern or the palm pattern like the present embodiment, a predetermined sensing weighting value may be given, thereby increasing linearity when detecting touch coordinates.

Figure 8:
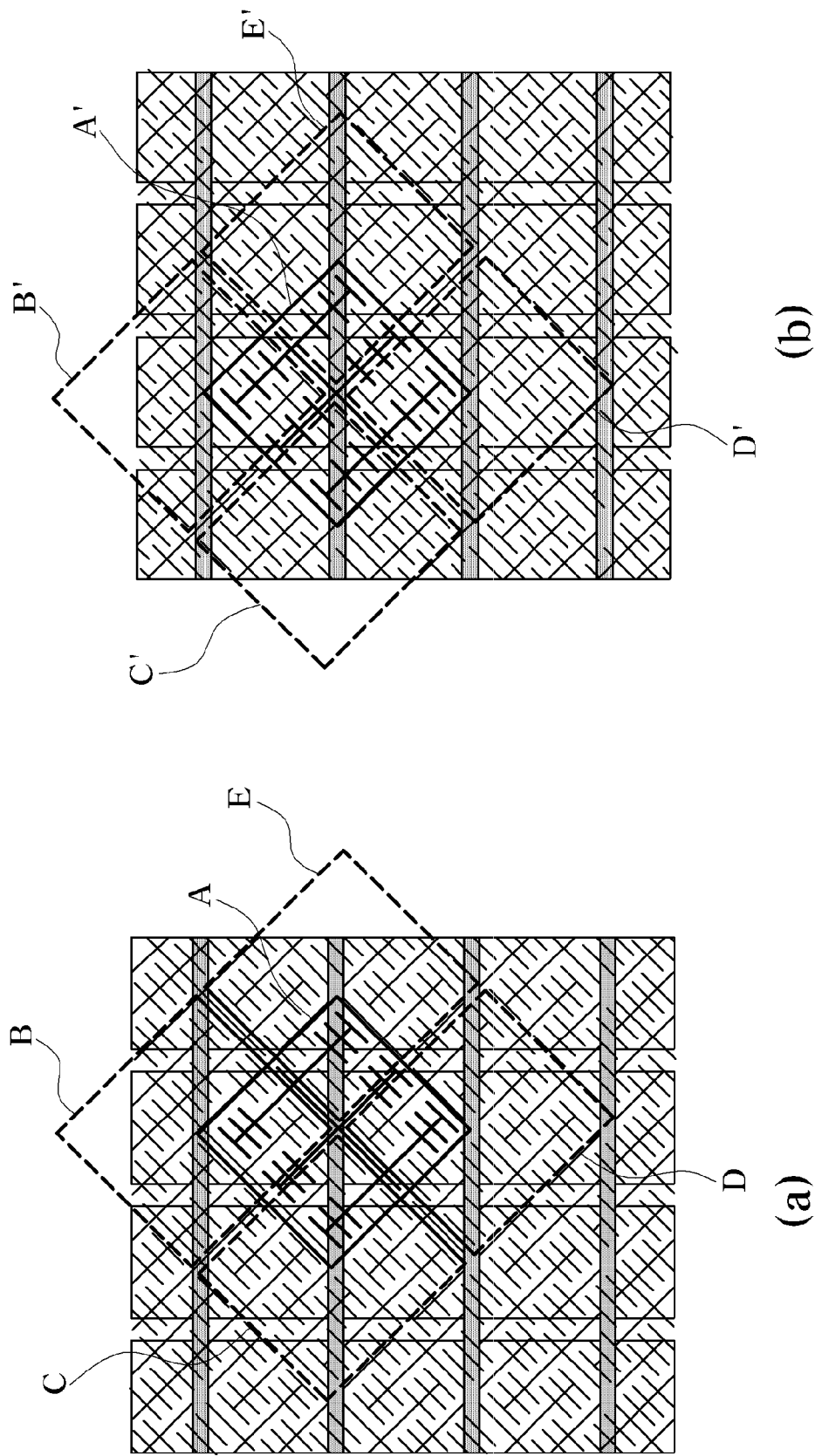
FIG. 8 is a schematic diagram illustrating a case in which any one sensor region is shared with other adjacent sensor regions.

Driving characteristics according to the above-described embodiments will be described with reference to drawings. FIG. 8 shows a region in which a touch of an object can be detected by a sensing electrode according to an embodiment of the present invention. Referring to FIG. 8A, bold lines are shown in order to easily identify a first branch, a second branch, and a finger pattern which are connected to any one main trace, and boundary of a region A physically occupied by the first and second branches and the finger pattern are also shown as a bold rectangle. As shown in FIG. 8A, the region A shares an area of regions C and E formed by the adjacent first and second branches and the adjacent finger pattern which are provided on the left and right sides of the region A.

In addition, the region A shares an area with a region B formed by the first branch, the second branch, and the finger pattern which are adjacent to and above the region A, and the region A shares an area with the region D formed by the first branch, the second branch, and the finger pattern which are adjacent to and below the region A. That is, a physical area occupied by a sensor is shared by sensors vertically and horizontally adjacent to the sensor.

In addition, referring to FIG. 8B, in the similar manner to the embodiment of FIG. 8A, a region A' occupied by a sensor is shared by regions B', C', D', and E' occupied by four different sensors adjacent to each other.

According to the present embodiments, a region physically occupied by any one sensor may be disposed so as to be shared together with four different sensors. The region refers to only a physical region in which a sensor is disposed, and a region in which a touch could be detected by reaction between any one sensor and an object may be more expanded from the physical region in which the sensor is disposed. Considering this, the number of sensors that can detect a touch together with a corresponding sensor in a region in which any one sensor is disposed may be at least four. Thus, when a touch by an object having a relatively small touch cross-sectional area such as a woman's finger or a child's finger as well as a touch by a relatively large object such as a man's finger is performed, touch coordinates may be obtained using output values of at least four sensors, and therefore accuracy and sensitivity of the touch coordinates may be increased when the touch coordinates are extracted. And coordinates extracted for the small object is more linear to object movement, because at least four adjacent sensors participate in the coordinate extraction.

That is, in order to obtain a touch or a gesture trajectory obtained from linear reaction with an object having a smaller cross-sectional area, a larger number of sensors should be provided for a same area. However, in the present invention, the same number of sensors may be provided in the same pitch as in the related art, but a coverage area covered by a single sensor may be expanded and shared with coverage areas of other sensors. Consequently, more precise coordinates and trajectory with respect to a touch and a gesture input by the object with the relatively small cross-sectional area may be obtained by linear reaction with sensors. In addition, the finger pattern or the palm pattern which is a sensing weighting pattern may be formed in the second branch, and therefore, even when an object touches a position spaced apart from a sensor, precise touch coordinates may be extracted from linear reaction with the sensor and an object performing touch.

Figure 9:
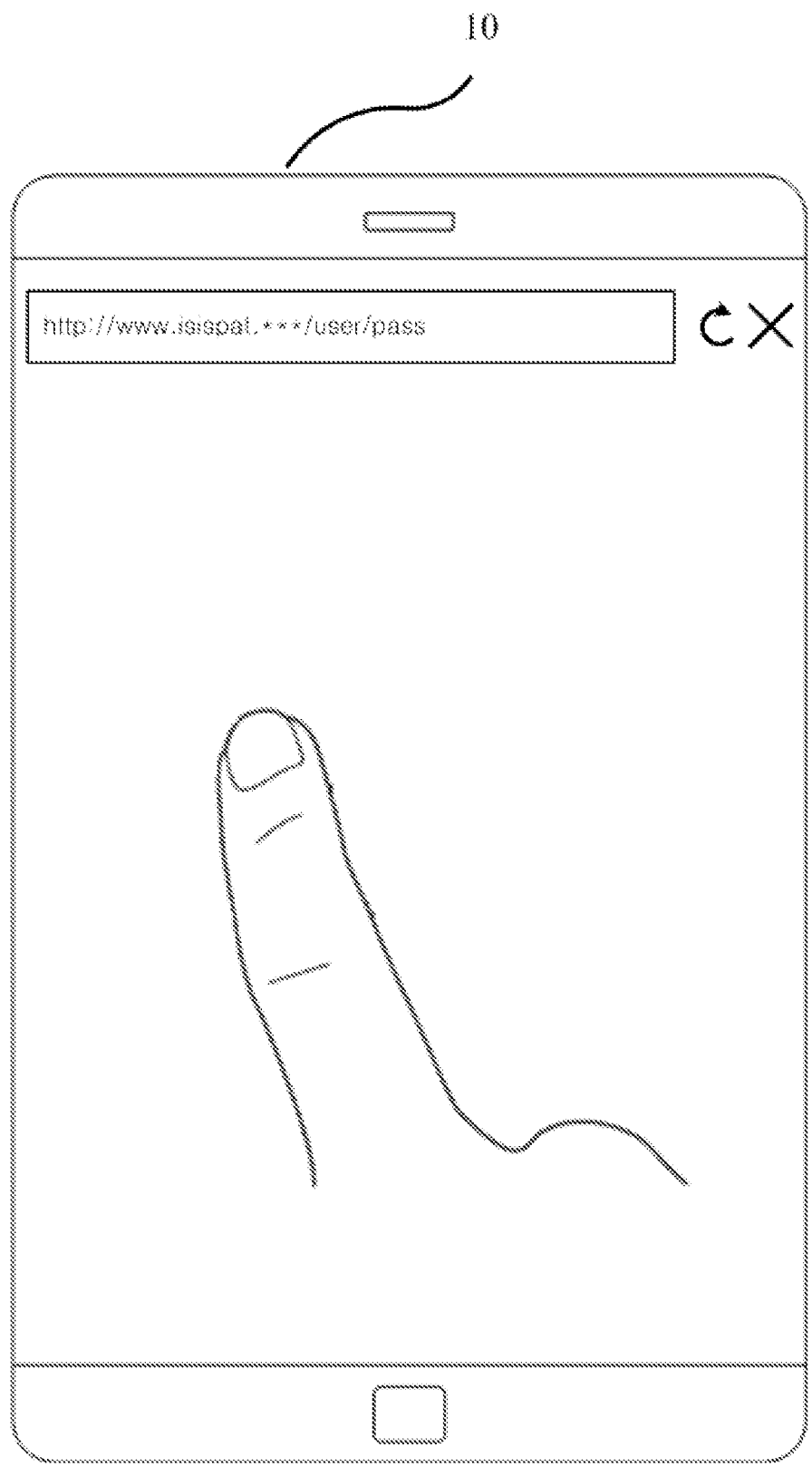
FIG. 9 is a schematic diagram illustrating a case in which a capacitive touch-sensitive panel according to an embodiment of the present invention is adopted in a mobile terminal.

The capacitive touch-sensitive panel described above may be adopted in a mobile terminal 10 as shown in FIG. 9, and a touch input may be applied from a user, and therefore a predetermined operation may be performed. In addition, although not shown, the capacitive touch-sensitive panel may be applied to a mobile phone, a laptop computer, a tablet, a navigation device, a music player, and the like, and a touch input may be applied from a user, and therefore a predetermined operation may be performed.

Simulation Test Example

A comparison simulation test between a touch panel according to an embodiment of the present invention which has the above-described configuration and a touch panel according to the related art has been conducted. A computer simulation test has been conducted on a linear index indicating difference between actual touch coordinates and touch coordinates detected by the touch panel and a delta CM ratio indicating sensitivity of a sensor with respect to an object for performing touch.

In the following Table 1, performance with respect to results of the simulation test conducted while changing a diameter of an object to 2 pi, 4 pi, 6 pi, 8 pi, and 10 pi is summarized. A maximum coordinate error denotes a maximum value among errors between actually touched coordinates and detected coordinates for each size of the objects, and an average coordinate error denotes an average value of detected coordinate errors. A delta CM ratio denotes an index indicating sensitivity of a sensor with respect to an object, and a sensor more sensitively reacts to the object as the delta CM ratio is higher. In addition, an overall performance index (figure of merit) denotes a value obtained by dividing the delta CM ratio by a coordinate error average value, and increases as the delta CM ratio increases and the coordinate error average value decreases. In addition, upper rows of each size of the object indicate result values according to the related art and lower rows thereof indicate result values according to the present invention.

When the diameter of the object is relatively small such as 2 pi and 4 pi, the maximum coordinate error and the coordinate error average according to the present invention correspond to about 50% of the maximum coordinate error according to the related art, which shows the fact that coordinates may be more accurately detected compared to the related art even when a touch is generated by a relatively small object. In addition, from Table 1, it can be seen that sensitivity of the sensor with respect to an overall object size is significantly increased. Based on such results, the overall performance index six times or higher than the related art is exhibited based on improved sensitivity and reduced coordinate error average value compared to the related art.

TABLE 1

|  | Maximum coordinate error (mm) | Average Coordinate error (mm) | Delta CM ratio (%) | Overall performance index | |
|---|---|---|---|---|---|
| 2 pi | 1.78 | 1.04 | 1.09 | 0.61 | 6.11 |
|  | 0.85 | 0.52 | 3.18 | 3.74 |  |
| 4 pi | 0.99 | 0.53 | 4.99 | 5.04 | 3.2 |
|  | 0.46 | 0.27 | 7.42 | 16.13 |  |
| 6 pi | 0.53 | 0.25 | 8.00 | 15.09 | 2.381 |
|  | 0.32 | 0.15 | 11.50 | 35.94 |  |

TABLE 1-continued

|  | Maximum coordinate error (mm) | Average Coordinate error (mm) | Delta CM ratio (%) | Overall performance index | |
|---|---|---|---|---|---|
| 8 pi | 0.34 | 0.13 | 8.47 | 24.91 | 2.71 |
|  | 0.20 | 0.12 | 13.51 | 67.55 | |
| 10 pi | 0.32 | 0.20 | 8.60 | 26.88 | 2.08 |
|  | 0.25 | 0.16 | 13.99 | 55.96 | |

As described above, according to the embodiments of the present invention, the second branches adjacent to each other are disposed so as to be interdigitated, so that the second branches are disposed within a detection region of the adjacent main trace to detect a touch, thereby smoothly detecting an object even with a relatively small cross-sectional area.

In addition, any one second branch is disposed so as to be interdigitated in the detection region of the adjacent main trace to detect a touch, and therefore, even when a touch input is applied by an object with a relatively small cross-sectional area, touch coordinates detected in reaction to the touch input in a linear manner may be output. In addition, interpolation performance in a physical level may be improved by the interdigitated form.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A capacitive touch-sensitive panel comprising:
a dielectric substrate;
a plurality of first conductive traces which extend in a first direction and are formed on one surface of the dielectric substrate; and
a plurality of second conductive traces which are formed on the other surface of the dielectric substrate,
wherein the second conductive traces include a main trace which extends in a second direction, a first branch which extends so as to obliquely intersect the main trace, and a second branch which is connected to the first branch and extends so as to intersect the first branch at an angle at which the second branch is not connected to another adjacent second branch.

2. The capacitive touch-sensitive panel of claim 1, wherein the dielectric substrate is a transparent dielectric substrate.

3. The capacitive touch-sensitive panel of claim 1, wherein the first direction and the second direction are orthogonal to each other.

4. The capacitive touch-sensitive panel of claim 1, wherein the second branches of the second conductive trace which are adjacent to each other are interdigitated.

5. The capacitive touch-sensitive panel of claim 1, wherein intersections of the main trace and the first branch are located just above the first conductive trace or just above a gap between the first conductive traces.

6. The capacitive touch-sensitive panel of claim 1, wherein a dummy pattern which is in a floating state is located on the other surface of the dielectric substrate.

7. The capacitive touch-sensitive panel of claim 1, wherein a palm pattern is disposed in the second branch.

8. The capacitive touch-sensitive panel of claim 7, wherein the palm patterns electrically connected to the second conductive traces adjacent to each other are disposed so as to be interweaved.

9. The capacitive touch-sensitive panel of claim 1, wherein a finger pattern is disposed in the second branch.

10. The capacitive touch-sensitive panel of claim 9, wherein the finger patterns electrically connected to the second conductive traces adjacent to each other are disposed so as to be interdigitated.

11. The capacitive touch-sensitive panel of claim 1, further comprising:
a display panel which is disposed in one surface direction of the capacitive touch-sensitive panel,
wherein the plurality of first conductive traces block noise emitted from the display panel.

12. A mobile terminal which includes a capacitive touch-sensitive panel including
a dielectric substrate,
a plurality of first conductive traces which extend in a first direction and are formed on one surface of the dielectric substrate, and
a plurality of second conductive traces which are formed on the other surface of the dielectric substrate,
wherein the second conductive traces include a main trace which extends in a second direction, a first branch which extends so as to obliquely intersect the main trace, and a second branch which is connected to the first branch and extends so as to intersect the first branch at an angle at which the second branch is not connected to another adjacent second branch.

13. The mobile terminal of claim 12, wherein the mobile terminal is any one of a laptop computer, a phone, a music player, a tablet, and a navigation device.

14. A capacitive touch-sensitive panel comprising:
a plurality of driving electrodes which extend in a first direction; and
a plurality of sensing electrodes which are spaced apart from the plurality of driving electrodes by a dielectric substrate,
wherein the plurality of sensing electrodes include a main sensing electrode which extends in a direction orthogonal to the first direction, a first interpolation branch which extends so as to obliquely intersect the main sensing electrode, and a second interpolation branch which is connected to the first interpolation branch and extends so as to intersect the first interpolation branch at an angle at which the second interpolation branch is not connected to another adjacent second interpolation branch.

15. The capacitive touch-sensitive panel of claim 14, wherein the dielectric substrate is a transparent dielectric substrate.

16. The capacitive touch-sensitive panel of claim 14, wherein the second interpolation branches of the sensing electrodes adjacent to each other are interdigitated.

17. The capacitive touch-sensitive panel of claim 14, wherein intersections of the main sensing electrode and the driving electrode are located just above the driving electrode or just above a gap between the driving electrodes.

18. The capacitive touch-sensitive panel of claim 14, wherein a dummy pattern which is in a floating state is located on a surface of the dielectric substrate in which the sensing electrode is located.

19. The capacitive touch-sensitive panel of claim 14, wherein a sensing weighting pattern is connected to the second interpolation branch.

20. The capacitive touch-sensitive panel of claim 19, wherein the sensing weighting pattern is any one of a palm pattern and a finger pattern.

21. The capacitive touch-sensitive panel of claim 19, wherein the sensing weighting patterns electrically connected to the sensing electrodes adjacent to each other are interweaved.

22. The capacitive touch-sensitive panel of claim 14, further comprising:
 a display panel which is disposed in one surface direction of the capacitive touch-sensitive panel,
 wherein the plurality of driving electrodes block noise emitted from the display panel.

23. The capacitive touch-sensitive panel of claim 14, wherein the capacitive touch-sensitive panel is coupled with a portable terminal.

* * * * *